(12) United States Patent
B T et al.

(10) Patent No.: US 10,620,894 B2
(45) Date of Patent: Apr. 14, 2020

(54) PRINTERS AND/OR PRINTER SETTINGS RECOMMENDATION BASED ON USER RATINGS

(71) Applicant: Hewlett-Packard Development Company, L.P., Houston, TX (US)

(72) Inventors: Darshan B T, Bangalore (IN); Abdul Qader Mohd, Bangalore (IN); Sharanabasappa Biradar, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,357

(22) PCT Filed: Jan. 10, 2017

(86) PCT No.: PCT/US2017/012835
§ 371 (c)(1),
(2) Date: Oct. 29, 2018

(87) PCT Pub. No.: WO2018/013170
PCT Pub. Date: Jan. 18, 2018

(65) Prior Publication Data
US 2019/0146726 A1    May 16, 2019

(51) Int. Cl.
*G06F 3/12* (2006.01)
(52) U.S. Cl.
CPC ............ *G06F 3/126* (2013.01); *G06F 3/1203* (2013.01); *G06F 3/1205* (2013.01); *G06F 3/1273* (2013.01); *G06F 3/1285* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 6,348,971 B2 * | 2/2002 | Owa | G06F 3/1204 358/1.1 |
| 6,552,813 B2 * | 4/2003 | Yacoub | G06F 3/1204 358/1.1 |
| 7,143,210 B2 * | 11/2006 | Ferlitsch | G06F 3/1204 710/38 |
| 7,847,956 B2 | 12/2010 | Farrell et al. | |

(Continued)

FOREIGN PATENT DOCUMENTS

WO    WO-2014202138 A1    12/2014

*Primary Examiner* — Paul F Payer
(74) *Attorney, Agent, or Firm* — HP Inc. Patent Department (57) ABSTRACT

In one example, a server is disclosed, which includes a communication interface to obtain printer data and attribute data associated with a plurality of print jobs that has been processed by at least one printer and obtain a user rating corresponding to each of the plurality of print jobs. Further, the server may include an analyzing unit to determine a predictive model by analyzing the user ratings, printer data and attribute data corresponding to each print job of the plurality of print jobs. Furthermore, the server may include a recommendation unit to recommend a printer, printer settings or combination of the printer and printer settings based on a given print job using the predictive model.

20 Claims, 5 Drawing Sheets

(56) References Cited

U.S. PATENT DOCUMENTS

| | | |
|---|---|---|
| 8,125,684 B2 | 2/2012 | Triplett et al. |
| 8,559,033 B2 | 10/2013 | Kohli et al. |
| 8,654,398 B2 | 2/2014 | Dewancker et al. |
| 8,842,319 B2 * | 9/2014 | DeRoller ........... H04N 1/00854 358/1.15 |
| 9,019,533 B2 | 4/2015 | Pan |
| 2009/0225366 A1 | 9/2009 | Emori |
| 2011/0310433 A1 | 12/2011 | Hagiwara |

* cited by examiner

| DEVICE ID | PRINTER SETTING | ATTRIBUTE DATA | USER RATING |
|---|---|---|---|
| PRINTER 1 | COLOR; LANDSCAPE; SIMPLEX; A4 SHEET | COLOR IMAGE; JPEG; 8-BIT COLOR; 640X360 RES | 5 |
| PRINTER 2 | B/W; PORTRAIT; DUPLEX; A4 SHEET | TEXT DOC; 4311 WORDS; 12 PT SIZE; ARIAL FONT | 5 |
| PRINTER 1 | B/W; PORTRAIT; DUPLEX; A4 SHEET | TEXT DOC; 500 WORDS; 12 PT SIZE; ARIAL FONT | 3 |
| PRINTER 1 | COLOR; LANDSCAPE; SIMPLEX; A4 SHEET | COLOR IMAGE; JPEG; 8-BIT COLOR; 640X360 RES | 4 |
| PRINTER 2 | COLOR; LANDSCAPE; SIMPLEX; A4 SHEET | COLOR IMAGE; JPEG; 8-BIT COLOR; 640X360 RES | 3 |
| PRINTER 2 | COLOR; LANDSCAPE; SIMPLEX; A4 SHEET | COLOR IMAGE; JPEG; 8-BIT COLOR; 640X360 RES | 4 |

FIG. 3B

| DEVICE ID | PRINTER SETTING | ATTRIBUTE DATA 318 | AVERAGE USER RATING |
|---|---|---|---|
| PRINTER 1 | COLOR; LANDSCAPE; SIMPLEX; A4 SHEET | COLOR IMAGE; JPEG; 8-BIT COLOR; 640X360 RES | 318A  4.5 |
| PRINTER 2 | B/W; PORTRAIT; DUPLEX; A4 SHEET | TEXT DOC; 4311 WORDS; 12 PT SIZE; ARIAL FONT | 318B  5 |
| PRINTER 1 | B/W; PORTRAIT; DUPLEX; A4 SHEET | TEXT DOC; 500 WORDS; 12 PT SIZE; ARIAL FONT | 318C  3 |
| PRINTER 2 | COLOR; LANDSCAPE; SIMPLEX; A4 SHEET | COLOR IMAGE; JPEG; 8-BIT COLOR; 640X360 RES | 318D  3.5 |

PRINTERS AND/OR PRINTER SETTINGS RECOMMENDATION BASED ON USER RATINGS

BACKGROUND

In a networked environment, multiple printers may have different printing capabilities. For instance, each printer may be capable of performing a print operation complying to a plurality of printer settings, such as orientation, paper size, print resolution, print speed and the like. In enterprises/organizations, users may be provided with a list of printers with various print settings for printing documents.

BRIEF DESCRIPTION OF THE DRAWINGS

Examples are described in the following detailed description and in reference to the drawings, in which.

DETAILED DESCRIPTION

In a networked environment, a user may be provided with a list of printers with various print settings for printing a document. In such cases, the user may not be aware of a printer which is suitable for a given printer setting, document type and print-media. For example, when a user wants to print a document (e.g., photo), the user may not be aware of printer that can provide a high quality print. Further, performance of the printer corresponding to the document may not match the printer's specification.

Examples described herein may use a server to recommend printers and/or printer settings based on user ratings. The server may include a communication interface to obtain printer data and attribute data associated with a plurality of print jobs that has been processed by printers. Further, the communication interface may obtain a user rating corresponding to each of the plurality of print jobs. In an example, users may be prompted to provide an input rating corresponding to each print job via printer driver software residing in the client device or a printer control panel. Example user rating may include a predefined scale (e.g., 1 to 5).

Further, the server may include an analyzing unit to determine a predictive model by analyzing the user ratings, printer data and attribute data corresponding to each print job of the plurality of print jobs. Furthermore, the server may include a recommendation unit to recommend a printer, printer settings or combination of the printer and printer settings for subsequent print jobs using the predictive model.

Figure 1:
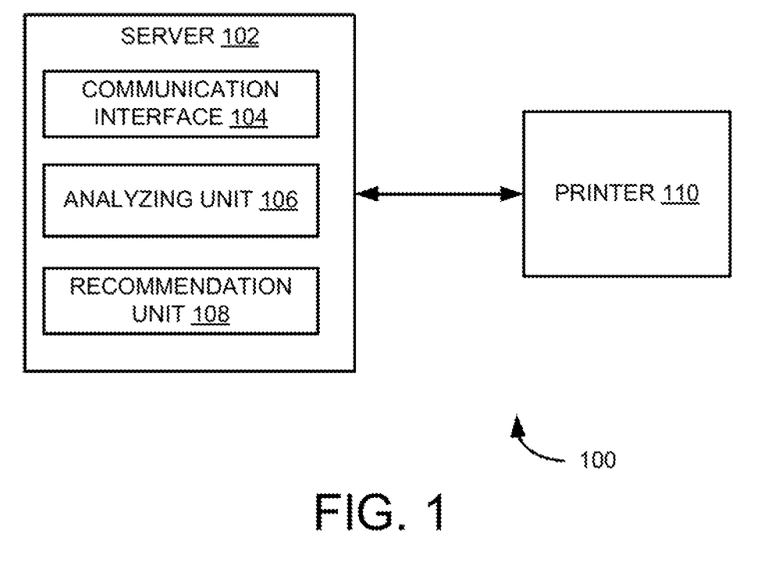
FIG. 1 is a block diagram of an example network environment including a server and at least one printer.
Figure 2:
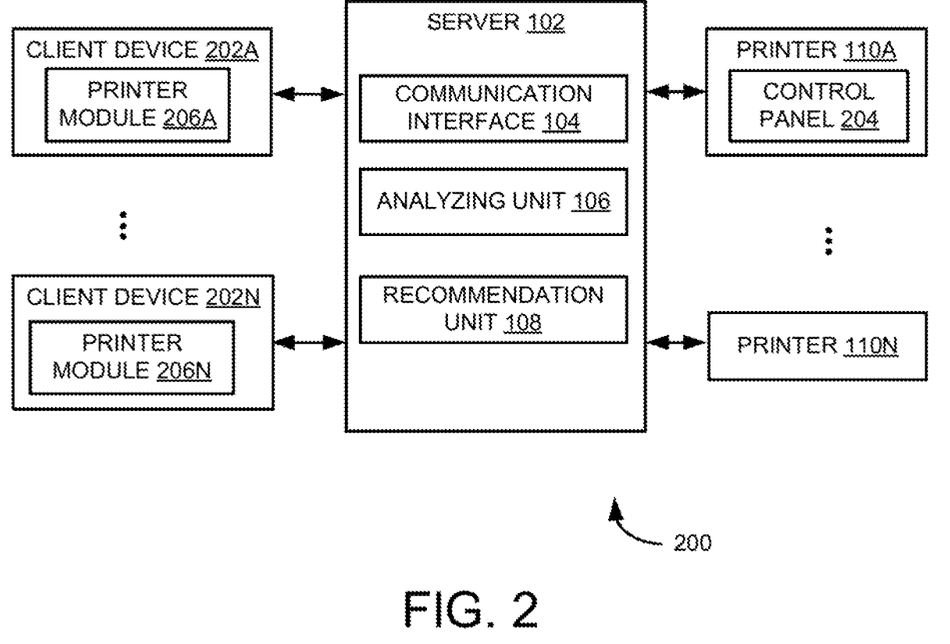
FIG. 2 is a block diagram of another example network environment including client devices and printers communicating via the server.

FIG. 1 is a block diagram of an example network environment 100 including a server 102 communicatively coupled to at least one printer 110. FIG. 2 depicts the example network environment including client devices 202A-N and printers 110A-N communicating via server 102. The term "printer" may refer to any image forming apparatus that accepts print job for printing an electronic document. In one example, the print job may be given through a client device (e.g., client device 202 of FIG. 2) connected to printer 110. In another example, the print job may be given directly from printer 110. For example, printer 110 may include a read-slot to receive a memory card, in which electronic documents to-be-printed are stored. Upon accessing the memory card, the electronic documents (e.g., photographic image) stored on the memory card may be previewed on a display screen of printer 110. Furthermore, a print job associated with the previewed documents may be triggered through a control panel of printer 110.

Figure 3A:
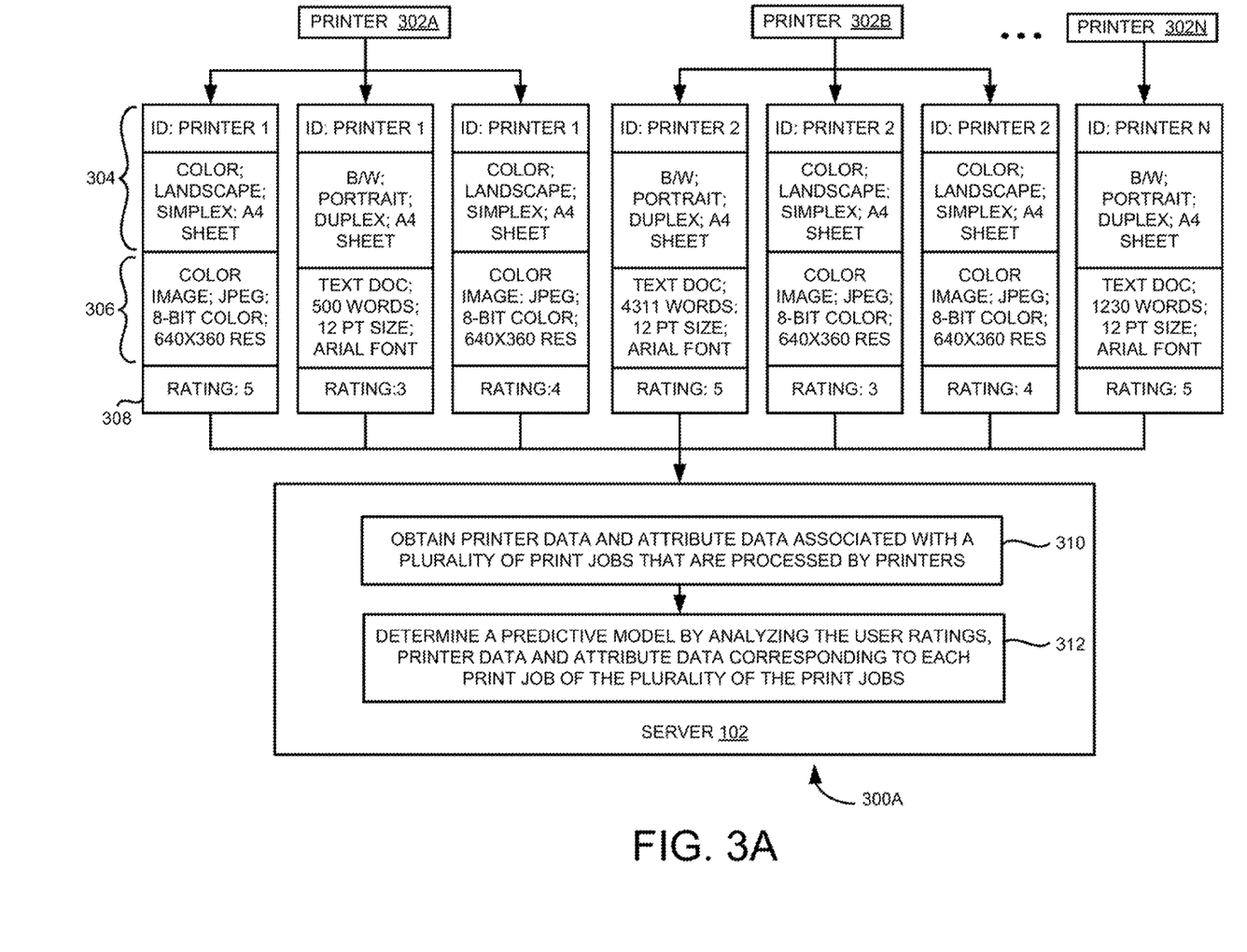
FIG. 3A is an example schematic illustrating creation of a predictive model based on printer data, attribute data and user rating associated with each print job.

As shown in FIG. 1, server 102 may include a communication interface 104, an analyzing unit 106, and a recommendation unit 108. During operation, communication interface 104 may obtain printer data and attribute data associated with a plurality of print jobs that has been processed by at least one printer 110. Example representation 300A of FIG. 3A, shows server 102 obtaining printer data 304 and attribute data 306 for each print job that has been processed by printers 302A-N (e.g., at 310). Example printer data 304 may include printer identifier (ID) and printer settings corresponding to each print job. The printer settings may include color settings (i.e., color/black & white), paper size, print medium type, resolution settings, orientation, duplex/simplex, number of copies, print quality, and the like. Example attribute data 306 may include type of document, size of document, properties of document or a combination thereof. In one example, attribute data may include amount of text, size and font of text, resolution, and the like, when a print job is associated with text document. In another example, attribute data may include image file format, color depth, font size, image content, pixel resolution, and the like, when a print job is associated with image data.

Further, communication interface 104 may obtain a user rating corresponding to each of the plurality of print jobs. In one example, upon processing the print job by printers 110A-N, users may be prompted to provide an input rating corresponding to each print job via control panel 204 associated with printer 110A or printer modules 206A-N (e.g., printer driver software) residing in client devices 202A-N (as shown in FIG. 2). Example client device may include, but not limited to, a cellular phone, a laptop, a desktop, a minicomputer, a mainframe computer, workstation, a smartphone, a personal digital assistant (PDA), an Internet of Things (IoT) device and other devices capable of triggering the print job for printing. The user rating may include a predefined scale (e.g., 1 to 5). Example representation 300A of FIG. 3A, shows user rating 308 provided for each print job that has been processed by printers 302A-N. The processes of 310 and 312 are explained in conjunction with FIG. 1.

During operation, analyzing unit 106 may determine a predictive model by analyzing the user ratings, printer data and attribute data corresponding to each print job of the plurality of print jobs (e.g., 312). In one example, analyzing unit 106 may determine the predictive model by classifying the user ratings based on the attribute data, the printer ID and the printer settings corresponding to each print job. Example classification of the user ratings based on the attribute data and the printer data (e.g., the printer ID and the printer settings) corresponding to each print job is shown in table 300B of FIG. 3B. In one example, the average user rating may be computed by performing a mathematical model on user ratings based on the example attribute data and the printer data shown in table 300B of FIG. 3B. In one example, the average user rating may be computed for each printer based on substantially similar printer data and attribute data. Example table 300C of FIG. 3C depicts a predictive model that includes average user rating corresponding to each print job.

During operation, recommendation unit 108 may recommend a printer, printer settings or combination of the printer and printer settings based on a given print job using the predictive model. In one example, recommendation unit 108 may retrieve attribute data associated with the given print job. Further, recommendation unit 108 may retrieve the printer, printer settings or the combination of the printer and printer settings corresponding to the retrieved attribute data in the predictive model. In one example, recommendation unit 108 may compare the retrieved attribute data with attribute data associated with each print job in the predictive model. Further, recommendation unit 108 may select an attribute data from the predictive model, which is substantially matching the retrieved attribute data. Furthermore, recommendation unit 108 may recommend/provide the printer, printer settings or combination of printer and printer settings corresponding to the selected attribute data based on the user ratings.

In one example, recommendation unit 108 may recommend a printer corresponding to the given print job when printer settings are specified (e.g., by a user) for the given print job. Further, the recommended printer and printer settings may be configured automatically for processing the given print job. Alternately, the recommended printer and printer settings may be configured for processing the given print job upon validation from the user.

Figure 3B:
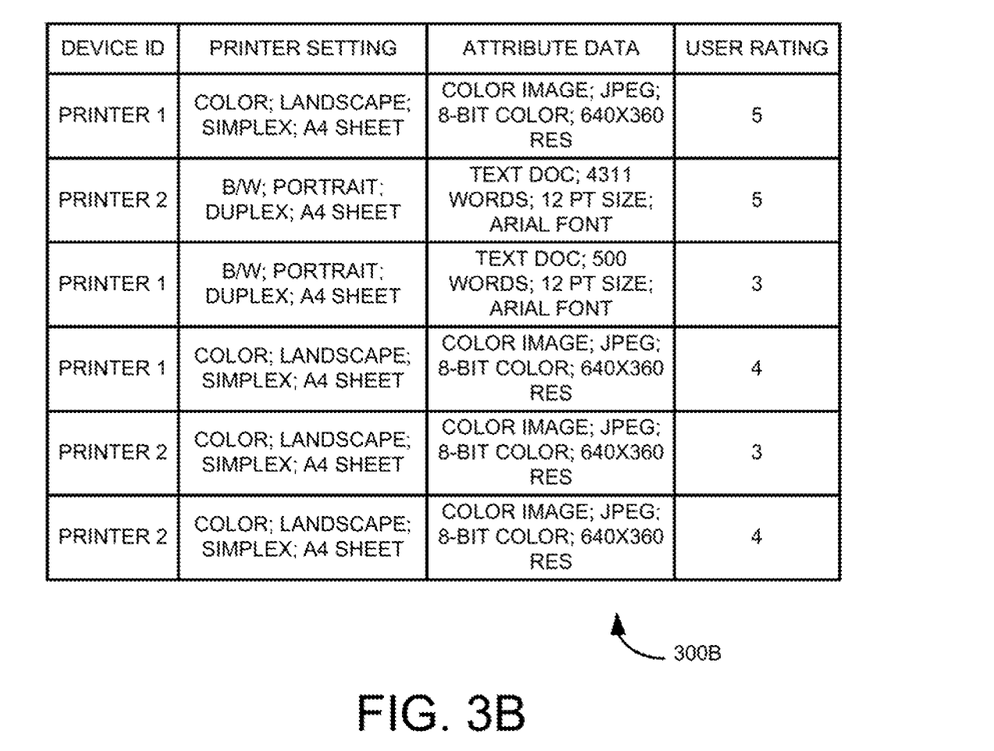
FIG. 3B illustrates a table depicting example printer data, attribute data and user rating associated with each print job.
Figure 3C:
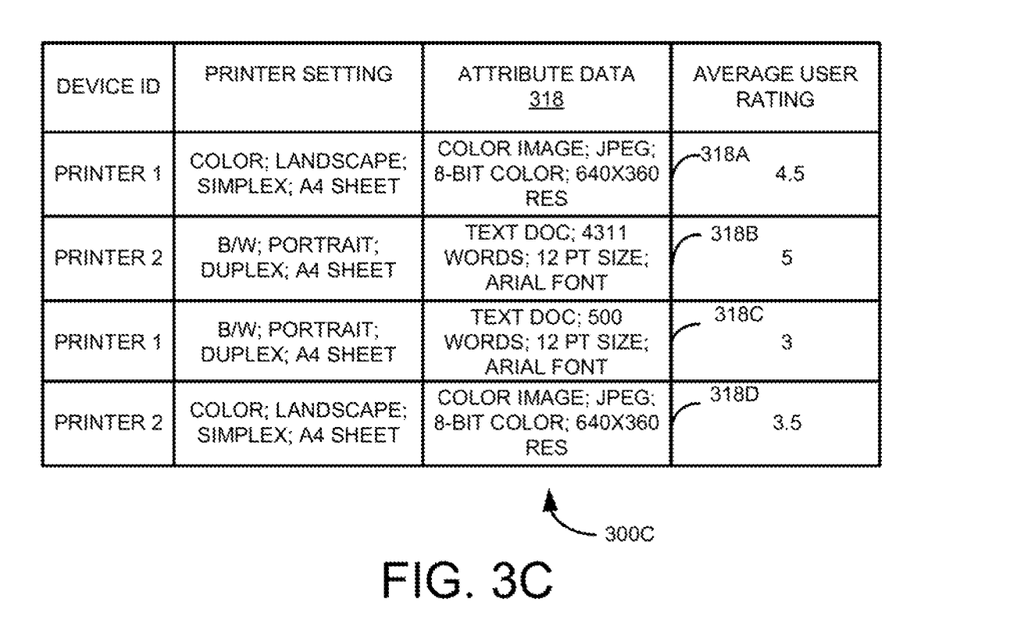
FIG. 3C illustrates a table depicting an example predictive model based on analysis of the printer data, attribute data and user ratings of FIG. 3B.

As shown in FIGS. 3A-3C, when a new print job for printing a "photo" is given through printer 302B, server 102 may perform the following:

I. retrieve the attribute data such as "Color image"; "JPEG format"; "8-bit Color"; "640×360 Resolution" and the like associated with the given "photo";

II. compare the retrieved attribute data with each attribute data 318 in predictive model 300C;

III. upon comparison, select attribute data (e.g., 318A and 318D) which are substantially matching the retrieved attribute data, from predictive model 300C;

IV. among selected attribute data (e.g., 318A and 318D), determine that attribute data 318A for a color image that is printed at printer 302A has higher user rating "4.5" as compared to attribute data 318D for a substantially same color image that is printed at printer 302B; and V. recommend printer 302A and printer settings (e.g., "Color", "Landscape", "Simplex", "A4 Sheet", and the like) that corresponds to attribute data 318A having higher user rating, for processing the new print job.

In another example, consider another subsequent print job for printing "a PDF document (e.g., text document)" given through printer 302A, in this case, server 102 may perform the following:

I. retrieve the attribute data such as "text"; "4311 words"; "12-point size"; "Arial font" and the like associated with the subsequent print job;

II. compare the retrieved attribute data with each attribute data 318 in predictive model 300C (as shown in FIG. 3C);

III. upon comparison, select attribute data (e.g., 318B and 318C) from predictive model 300C, which are substantially matching the retrieved attribute data;

IV. among selected attribute data (e.g., 318B and 318C), determine that attribute data 318B for printing the document using printer 302B has a higher user rating "5" as compared to attribute data 318C for printing the substantially same document using printer 302A; and V. recommend printer 302B and printer settings (e.g., "Black/White", "Portrait", "Duplex", "A4 Sheet", and the like) that corresponds to attribute data 318B having higher user rating for processing the subsequent print job (e.g., the PDF document).

In above examples, when a printing operation is triggered for processing the print jobs among printers 302A-N, a printer (e.g., 302A or 302B) and/or associated printer settings corresponding to the given print job may be recommended for printing. In another example, when a printing operation is triggered for processing the print job in a particular printer, printer settings associated with the particular printer may be recommended for printing. Further, the predictive model may be dynamically updated on receiving a user rating for each given print job.

In another example, a duster printing option may be selected for sharing a print job among multiple printers. In this case, a plurality of printers and printer settings may be recommended. For example, consider a print job given for cluster printing a pdf document that includes image and text. In this case recommendation unit 108 may recommend printers (i.e., 302A and 302B) and associated printer settings for simultaneously printing text and image, respectively.

In yet another example, when a user wants to purchase a printer, the predictive model may be used to recommend printers that may serve the user's needs, upon receiving at least one of the user's intended printer settings or frequently used media type for printing.

In one example, the components of server 102, printer 110, and client devices 202A-N may be implemented in hardware, machine-readable instructions or a combination thereof. In one example, each of communication interface 104, analyzing unit 106 and recommendation unit 108 of server 102, printer module of client devices 202A-N, and control panel 204 of printers 110A may be implemented as engines or modules comprising any combination of hardware and programming to implement the functionalities described herein. Even though FIG. 1 describe about server 102, the functionality of the components of server 102 may be implemented in client devices 202A-N. Even though FIG. 1 describes about server 102, the functionality of the components of server 102 may be implemented in other electronic devices such as personal computers (PCs), server computers, tablet computers, mobile devices and the like.

In one example, the memory card accessible to printer 110 may include, but not limited to, an SD™ card (Secure Digital card), a CompactFlash I™ card, a CompactFlash II™ card, a SmartMedia™ card, a Memory Stick™, Memory Stick Duo™, a Memory Stick Micro M2™, a Multi Media card, a MMCmicro™ card, a RS-MMC Card™, a microSD™ card, a miniSD™, a MMCMobile™ card, XD-Picture Card™, a CompactFlash™, flash drives having a USB interface.

Figure 4:
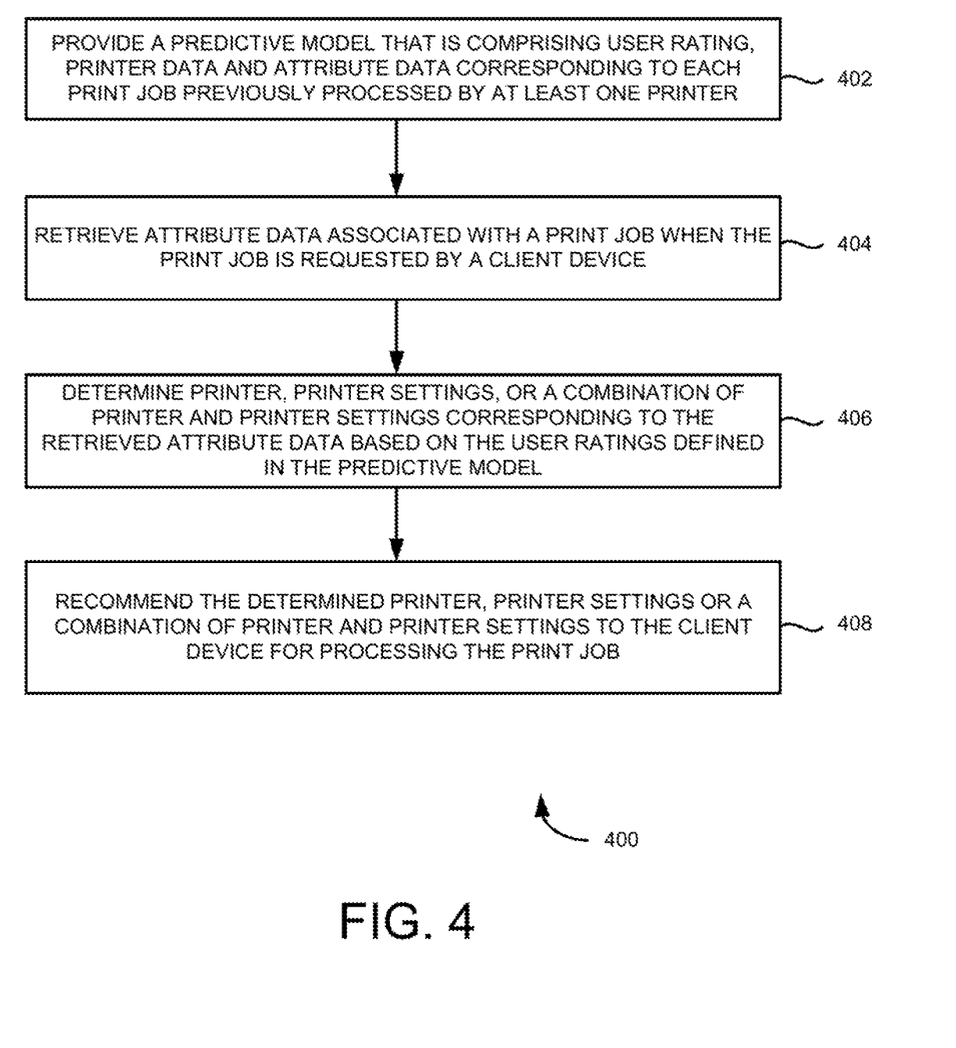
FIG. 4 depicts an example flow chart for recommending printer and/or printer settings to printer/client device.
Figure 5:
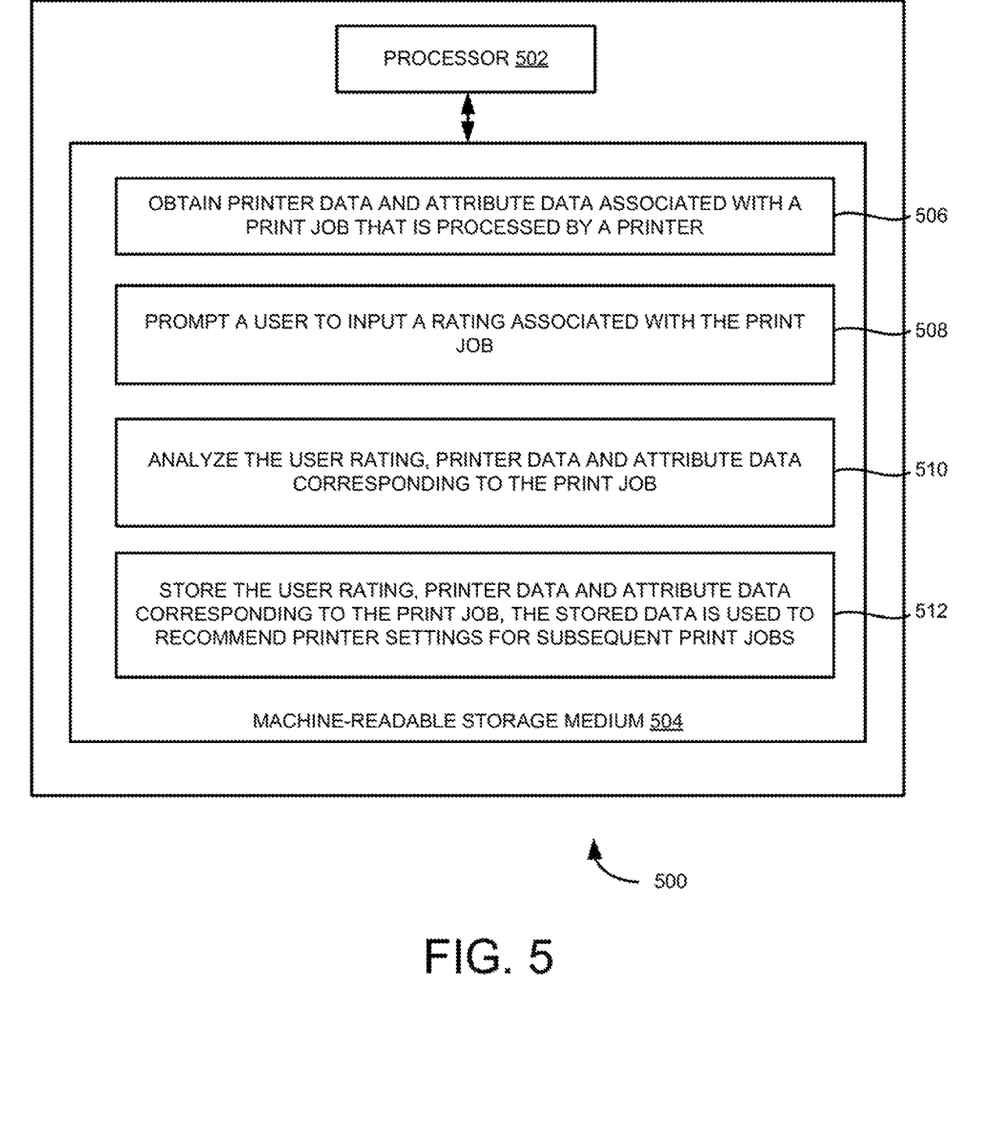
FIG. 5 depicts example block diagram showing a non-transitory computer-readable media to recommend printer and/or printer settings to printer/client device.

FIG. 4 depicts an example flow chart 400 of a process for recommending printer and/or printer settings for processing a given print job. It should be understood that the process depicted in FIG. 5 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate software, or use a combination of hardware and software to perform the illustrated processes.

At 402, a predictive model may be provided. The predictive model may include a user rating, printer data and attribute data corresponding to each print job previously processed by at least one printer. In one example, the predictive model may include the user ratings classified based on the printer data and attribute data corresponding to each print job.

Example user rating may include a predefined scale (e.g., 1 to 5). The user rating for the print job may be obtained via the at least one printer or the client device. The print job may be initiated from the at least one printer or the client device. Example printer data may include printer identifier (ID) and printer settings, and example attribute data may include properties of documents corresponding to each print job.

At 404, attribute data associated with a print job may be retrieved when the print job is requested by a client device. At 406, printer, printer settings, or a combination of printer and printer settings corresponding to the retrieved attribute data may be determined based on the user ratings defined in the predictive model. At 408, the determined printer, printer settings or a combination of printer and printer settings may be recommended to the client device for processing the print job. Further, the predictive model may be dynamically updated on receiving a user rating for the print job upon processing the print job.

FIG. 5 illustrates a block diagram 500 of an example computing device for recommending printer and/or printer settings for processing a given print job in a printer. The computing device includes a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to the computing device.

Machine-readable storage medium 504 may store instructions 506-512. In an example, instructions 506-512 may be executed by processor 502 to provide a mechanism for recommending printer settings to process subsequent print jobs in a printer. Instructions 506 may be executed by processor 502 to obtain printer data and attribute data associated with a print job that is processed by a printer. Instructions 508 may be executed by processor 502 to prompt a user to input a rating associated with the print job. In one example, user may be prompted to input the rating associated with the print job via the printer or a client device connected to the printer.

Instructions 510 may be executed by processor 502 to analyze the user rating, printer data and attribute data corresponding to the print job. Instructions 512 may be executed by processor 502 to store the user rating, printer data and attribute data corresponding to the print job. The stored data may be used to recommend printer settings for subsequent print jobs. Further, a predictive model may be created based on the analyzed user rating, printer data and attribute data corresponding to the print job.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A server, comprising:
 a communication interface to:
  obtain printer data and attribute data associated with a plurality of print jobs that has been processed by at least one printer; and
  obtain a user rating corresponding to each of the plurality of print jobs;
 an analyzing unit to determine a predictive model by analyzing the user rating, printer data and attribute data corresponding to each print job of the plurality of print jobs; and
 a recommendation unit to recommend a printer, printer settings or a combination of the printer and printer settings based on a given print job using the predictive model.

2. The server of claim 1, wherein the recommendation unit is to recommend the printer, printer settings or combination of the printer and printer settings based on the given print job using the predictive model, by:
 retrieving attribute data associated with the given print job;

retrieving the printer, printer settings or the combination of the printer and printer settings corresponding to the retrieved attribute data in the predictive model; and recommending the retrieved printer, printer settings or combination of the printer and printer settings based on the user ratings in the predictive model.

3. The server of claim 2, wherein the recommendation unit is to retrieve the printer, printer settings or the combination of the printer and printer settings corresponding to the retrieved attribute data, by:

comparing the retrieved attribute data with attribute data associated with each print job in the predictive model;

selecting an attribute data from the predictive model, which is substantially matching the retrieved attribute data; and providing the printer, printer settings or combination of printer and printer settings corresponding to the selected attribute data based on the user ratings.

4. The server of claim 1, wherein each user rating is obtained via the at least one printer or a client device connected to the at least one printer and wherein each print job is given from the at least one printer or the client device.

5. The server of claim 1, wherein the printer data includes printer identifier (ID) and printer settings corresponding to each print job of the plurality of print jobs and wherein the attribute data includes type of document, size of document, properties of document or a combination thereof.

6. The server of claim 5, wherein the analyzing unit is to:

classify the user ratings based on the attribute data, the printer ID and the printer settings corresponding to each print job.

7. The server of claim 1, wherein the recommendation unit is to recommend the printer corresponding to the given print job when printer settings are specified for the given print job.

8. The server of claim 1, wherein the predictive model is dynamically updated on receiving a user rating for the given print job.

9. The server of claim 1, wherein the communication interface is to prompt a user to input a rating associated with each of the plurality of print jobs.

10. A method comprising:

providing a predictive model, the predictive model comprising a user rating, printer data and attribute data corresponding to each print job previously processed by at least one printer;

retrieving attribute data associated with a print job when the print job is requested by a client device;

determining printer, printer settings, or a combination of printer and printer settings corresponding to the retrieved attribute data based on the user ratings defined in the predictive model; and recommending the determined printer, printer settings or combination of printer and printer settings to the client device for processing the print job.

11. The method of claim 10, wherein the predictive model comprises the user ratings classified based on the printer data and attribute data corresponding to each print job, and wherein the printer data includes printer identifier (ID) and printer settings, and wherein the attribute data includes properties of documents corresponding to each print job.

12. The method of claim 10, wherein the predictive model is dynamically updated on receiving a user rating for the print job upon processing the print job.

13. The method of claim 10, wherein the user rating for the print job is obtained via the at least one printer or the client device, and wherein the print job is initiated from the at least one printer or the client device.

14. The method of claim 10, further including:

prompting a user to input a rating associated with the print job.

15. The method of claim 10, wherein the determined printer is recommended when printer settings are specified.

16. A non-transitory computer-readable storage medium comprising instructions that, when executed by a processor, cause the processor to:

obtain printer data and attribute data associated with a print job that is processed by a printer;

prompt a user to input a rating associated with the print job;

analyze the user rating, printer data and attribute data corresponding to the print job; and store the user rating, printer data and attribute data corresponding to the print job, wherein the stored data is used to recommend printer settings for subsequent print jobs.

17. The non-transitory computer-readable storage medium of claim 16, further comprising instructions to create a predictive model based on the analyzed user rating, printer data and attribute data corresponding to the print job.

18. The non-transitory computer-readable storage medium of claim 16, further comprising instructions to prompt the user to input the rating associated with the print job via the printer or a client device connected to the printer.

19. The non-transitory computer-readable storage medium of claim 16, further comprising instructions to classify the user rating based on the attribute data, a printer identifier (ID), and printer settings corresponding to the print job.

20. The non-transitory computer-readable storage medium of claim 16, further comprising instructions to recommend a printer when printer settings are specified.

* * * * *